April 13, 1954

C. R. LINDBERG 2,675,206

VALVE FOR GARDEN HOSE OR THE LIKE

Filed May 31, 1950

INVENTOR:
Carl R. Lindberg
By: Leslie M. Hansen
HIS ATTORNEY.

Patented Apr. 13, 1954

2,675,206

UNITED STATES PATENT OFFICE 2,675,206

VALVE FOR GARDEN HOSE OR THE LIKE

Carl R. Lindberg, Los Gatos, Calif.

Application May 31, 1950, Serial No. 165,257

2 Claims. (Cl. 251—237)

1

This invention relates to valves and more particularly to improvements in a valve for garden hose or like fluid conveying conduits.

One object of this invention is to provide a valve structure of the character described which is simple in construction, economical in manufacture, and highly efficient in use.

Another object is to provide a valve structure with a freely movable valve body operable by water pressure for movement into open position.

Another object is to provide a manual control for the freely movable valve body for urging the later into closed position.

Another object is to provide means associated with the manual control for holding the same in predetermined positions to thereby limit movement of the valve body toward fully open position.

These and other objects and advantages of the present invention will become apparent from a reading of the following description in the light of the drawing in which.

Figure 1:
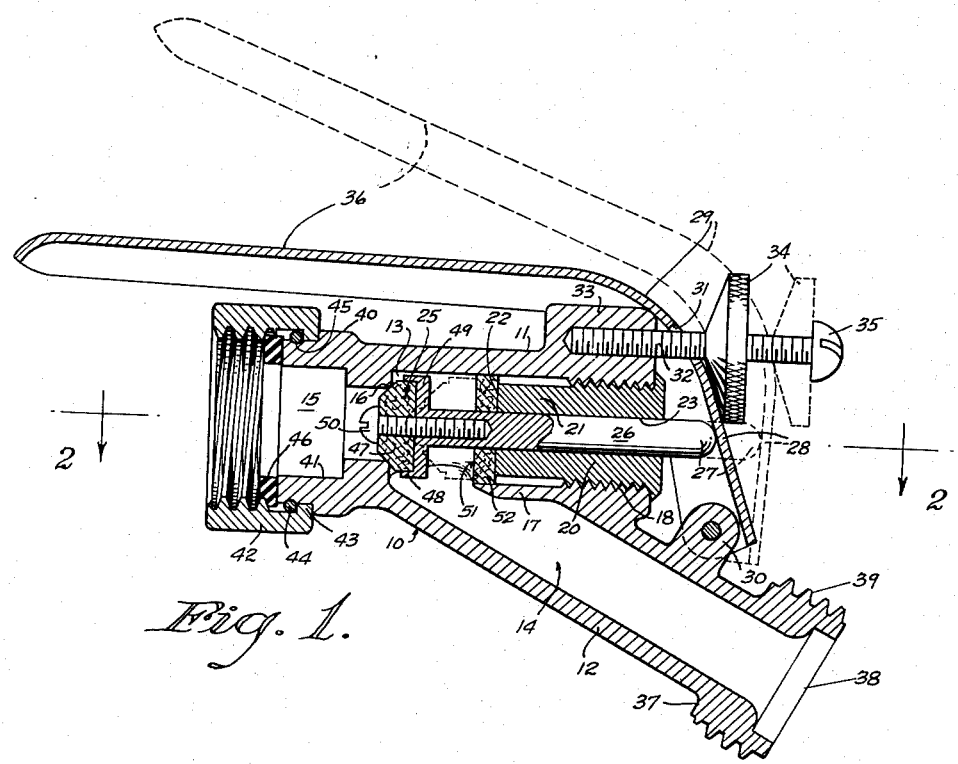
Fig. 1 is a longitudinal section through a valve embodying the present invention.

The valve 10 shown in the drawings comprises a main body 11 from which a discharge body 12 extends to divert the flow of liquid through the valve.

The main and discharge bodies are preferably die-cast so as to be integral and the inner configurations of the die casting are formed by a core to provide a main passage 13 clear through the main body communicating with a discharge passage 14 axially of the discharge body.

The main passage 13 has an inlet opening 15 adjacent which an annular valve seat 16 is formed internally of passage 13. The discharge passage 14 opens into passage 13 just beyond the valve seat 16 and preferably extends at a slight angle from the axis of the main body to require a minimum of divergence of the flow from the main body into the discharge body.

Beyond the inlet opening 15 a baffle 17 is formed between passages 13 and 14, the passage 13 terminating in an internally threaded portion 18 at the end of the main body 11.

A sleeve plug 20 is threadedly connected to the threaded portion 18 of the main body and has a portion 21 extending into the passage 13 of the latter sufficiently to provide a stop 22 for reasons later to become apparent. This

2 sleeve plug 20 is provided with an axial bore 23 which is coaxial with the annular valve seat 16.

A valve body 25 carried by a valve stem 26 is guided for sliding movement by the bore 23 in the sleeve plug 20. The free end 27 of the stem 26 extends beyond the end of the main body 11 and is adapted to be engaged by or to engage the web 28 of a lever 29. This lever 29 is mounted for pivotal movement on a lug 30 formed on the outer surface of the discharge body 12. Movement of the lever 29 into various positions effects limitation of the movement of the stem 26 relative to the guide sleeve 20. Moreover, when the lever 29 is pivoted toward the main body 11 the stem 26 is pressed inwardly of the sleeve to cause the valve body to rest upon the annular valve seat 16.

The web 28 of the lever 29 has an opening 31 through which a threaded shaft 32 extends. This shaft 32 is threadedly secured into a boss 33 formed integrally with the main body 11. A rider 34 is threadably mounted on the shaft 32 for threaded advancement or withdrawal toward or away from the web of the lever 29. The shaft 32 has an enlarged head 35 forming a stop for the rider to permit the lever to pivot toward one of its extreme positions relative to the valve stem 16.

The lever 29 is preferably of dog-leg form so as to provide a handle 36 on the lever in proximity to the main body 11. In this manner when the body 11 is held within the fingers of a person's hand, the handle 36 rests in the palm of that person's hand so as to be easily depressed at the option of the person so gripping the device. In this connection it should be noted that while the body 11 is held within one's upturned fingers and the lever so engaged by the palm of a person's hand, the rider 34 is in proximity and accessible to the thumb of that hand for manipulation thereby. In this manner, while the person grips the valve body between the palm and fingers of his hand, he can attain thumb action for moving the rider 34 along the threaded shaft and thereby limit or release the handle and valve stem for outward movement under the influence of the pressure behind the valve.

Upon complete depression of the lever handle, the web 28 forces the valve stem inwardly of the sleeve plug to press the valve body 25 firmly against the valve seat 16. In this manner all flow of fluid from the inlet 15 into the discharge passage 13 is cut off. If desired, the rider 34 can be advanced toward the web 28 to hold the lever 29 in the foregoing position. In this manner the user can release his grip on the handle 36 and the latter will yet maintain the valve body in closed position on the valve seat.

It will be apparent that any intermediate position to the handle can be maintained by changing the position of the rider 34 on the shaft 32. In this manner the flow of fluid through the valve 10 can be regulated to suit the purpose or flow speed required.

The free end 37 of the discharge body 12 is a spigot 38 provided with outside threading 39 of standard size and type to receive conventional nozzles, sprinkler heads and the like.

The main body 11 of the valve has an annular shoulder 40 surrounding the portion of the main body in which the inlet 15 is formed. From this shoulder a reduced tubular portion 41 of body 11 extends to receive a coupling member 42. The coupling has an internal flange 43 which fits the reduced portion 41 and a locking ring 44 seated in an annular groove 45 formed on the portion 41 retains the coupling thereon for free turning movement. The coupling 42 has a rubber gasket 46 within it and is threaded for connection to a garden hose or other fluid conduit, not shown.

Assume now that the valve 10 is connected by coupling 42 to a garden hose and the water supply to the latter turned on. The pressure of the water flowing into the inlet 15 of valve 10 tends to force the valve body 25 away from the valve seat 16. Consequently, when the rider 34 is turned out to the completely withdrawn position on the shaft 32, the water entering the passage 13 is deflected into the discharge passage 14.

In connection with the foregoing it will be noted that the valve body 25 comprises a frustro conical leather washer 47 of the type commonly used in conventional water faucets. This leather washer fits within an annular rim 48 formed on the enlarged head 49 of the valve stem 26 and is secured in place by a bolt 50 threadedly connected to the core of the stem. From the foregoing it will be apparent that the leather washer 47 is replaceable when worn.

Since the water flowing into the passage 13 from the inlet 15 is under pressure a suitable packing gland 51 is provided at the base of the sleeve slug 20. This gland 51 is in the form of an expansible washer 52 circumscribing the valve stem 26 and resting against the inner end 21 of the sleeve plug 20. It is this end of the sleeve plug that forms the stop 22 hereinbefore referred to. Consequently when the water flows into the passage 13, the expansible washer 52 is pressed against the inner end 21 of the sleeve plug and the threaded end of passage 13 is thereby sealed so that no leakage will occur either through such threading 18 or along the stem 26.

Figure 2:
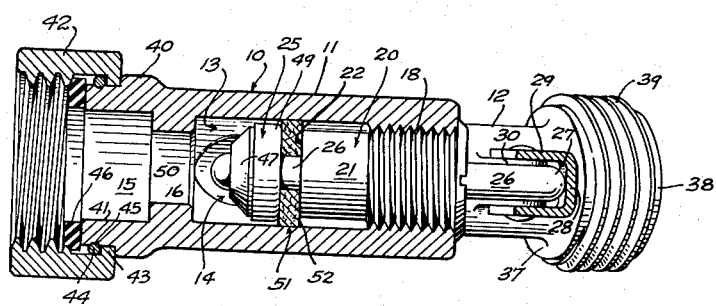
Fig. 2 is a section of Fig. 1 taken substantially along line 2—2 thereof.

The foregoing explanation assumes that the valve is open to its full extent so that the water is diverted at full capacity out through the discharge passage. Obviously the pressure of the water holds the valve body 25 in its extreme open position (Fig. 2) in which the stem 26 urges the lever into the position shown in dotted lines Fig. 1. It will therefore be apparent that a depression of the handle 36 against the pressure of the flow of the water through the valve changes the position of the valve body 25 relative to the valve seat 16. In this manner the flow of the water as aforesaid is reduced, as desired, or entirely stopped dependent upon the position of the lever 29. Such position can be maintained by manipulation of the rider 34 along the shaft 32 to limit outward movement of the valve body and stem 26 against the action of the water pressure.

From the foregoing it will be apparent that I have provided a simple and improved form of valve structure requiring no springs or other auxiliary parts for controlling the flow of liquid therethrough. Moreover, this construction provides a leak-proof construction and one in which the flow of liquid can be completely cut off without danger of leakage along the sleeve plug or the valve stem guided thereby. With such an arrangement the hose to which the valve is connected stands ready to deliver water through the discharge spigot whenever required. The flow of liquid can be trained at the plants only and the flow cut off during the change of direction from one plant to another.

While I have described the best mode of carrying my invention into practice it will be apparent that the structure defined may be varied, modified or altered without departing from the spirit of the invention. I therefore desire to avail myself of all variations, modifications and alterations as fairly fall within the scope of the appended claims.

What I claim as new and desire to protect by Letters Patent is:

1. The combination with a body for a valve having an inlet connectable to a garden hose and having a valve seat disposed directly forwardly of said inlet to provide a seat for a pressure opened valve having its stem projecting forwardly of said body, and an outlet spigot communicating with said body just to the front of said valve seat and diverging downwardly and forwardly from said body so as to fit in the fingers of the hand of a person holding said body; of control means for said valve comprising a lug on the forward outer surface of said spigot, a lever mounted for pivotal movement on said lug, said lever overlying and engaging the fore end of said valve stem and having a handle portion bent backwardly in substantial parallelism to said valve body within the palm of the hand of the person so holding said body, a threaded shaft extending forwardly from said body parallel to said valve stem and through an opening formed in that portion of said lever engaging said valve stem, and a rider threadedly mounted on the extended end of said shaft in proximity to the thumb of the hand of the person so holding said body for ready movement along said shaft by thumb action for limiting or releasing outward movement of said lever and said valve stem under the influence of said pressure opened valve.

2. The combination with a body for a valve having an inlet connectable to a garden hose and having a valve seat disposed directly forwardly of said inlet to provide a seat for a pressure opened valve having its stem projecting forwardly of said body and an outlet spigot communicating with said body just to the front of said valve seat and diverging downwardly and forwardly from said body so as to fit in the fingers of the hand of a person holding said body; of control means for said valve comprising a lug on the forward outer surface of said spigot directly below the fore end of said valve stem, a lever having a channel shaped fore end providing a web portion overlying and engaging the fore end of said valve stem and a pair of flanges embracing the same as well as said lug, means for pivotally connecting the flanges of said lever to said lug, said lever having its free end portion bent backwardly so as to lie substantially parallel to said valve body for engagement by the palm of the hand of the person so holding said body, the web portion of said lever having an opening formed therethrough adjacent its point of engagement with said valve stem, a threaded, headed shaft extending forwardly from said body parallel to the valve stem and through the opening formed in the web portion of said lever, and a rider threadedly mounted on said shaft in proximity to the thumb of the hand of the person so holding said body for ready movement along said shaft by thumb action for limiting or releasing outward movement of said lever and said valve stem under the influence of said pressure opened valve, the head of said threaded shaft limiting outward movement of said rider.

References Cited in the file of this patent

UNITED STATES PATENTS

| Number | Name | Date |
|---|---|---|
| 607,732 | Burger | July 19, 1898 |
| 1,034,911 | Hagman | Aug. 6, 1912 |
| 1,195,155 | Ross | Aug. 15, 1915 |
| 1,235,221 | Marsh | July 31, 1917 |
| 1,248,957 | Voigt | Dec. 4, 1917 |
| 1,606,191 | Siebenmann | Nov. 9, 1926 |
| 1,693,095 | Ritchie et al. | Nov. 27, 1928 |
| 2,410,105 | Remus | Oct. 29, 1946 |

FOREIGN PATENTS

| Number | Country | Date |
|---|---|---|
| 4,898 | Norway | Aug. 31, 1896 |
| 177,876 | Switzerland | 1935 |